Nov. 12, 1968  W. H. HERBERT ET AL  3,409,989

POSITIONING AND GAUGING FIXTURE FOR ENGINE BLOCKS

Filed Dec. 14, 1966  3 Sheets-Sheet 1

INVENTORS
WILLIAM H. HERBERT
ROLAND EUGENE DELAMATER

BY *Oberlin, Maky & Donnelly*
ATTORNEYS

Nov. 12, 1968    W. H. HERBERT ET AL    3,409,989
POSITIONING AND GAUGING FIXTURE FOR ENGINE BLOCKS
Filed Dec. 14, 1966    3 Sheets-Sheet 3

INVENTORS
WILLIAM H. HERBERT
ROLAND EUGENE DELAMATER
BY Oberlin, Maky & Donnelly
ATTORNEYS United States Patent Office 3,409,989
Patented Nov. 12, 1968

3,409,989
POSITIONING AND GAUGING FIXTURE FOR ENGINE BLOCKS
William H. Herbert, Eastlake, and Roland Eugene Delamater, Cleveland Heights, Ohio, assignors to Curtis Noll Corporation, Cleveland, Ohio, a corporation of Ohio
Filed Dec. 14, 1966, Ser. No. 601,801
8 Claims. (Cl. 33—180)

ABSTRACT OF THE DISCLOSURE

Positioning and gauging fixture for use in a production line where a rough engine block casting is machined. The fixture is located at the first or qualifying station of a long line transfer and multiple station machine at which station the engine casting is oriented with respect to machine tool so to provide reference locations. The fixture includes a pair of probes which engage the manufacturing holes and a limit switch controlled equalizer bar which when actuated pushes against one of probes, and moves the engine block to the proper position before it is clamped and machined.

---

This invention relates to transfer machinery of the long-line production type, or more particularly, to one station of such a machine or even any single machine wherein a positioning and gauging function is performed. The transfer or multiple station type of machine finds extensive use in the mass production field, where various parts are moved along a production line and have a sequence of operations performed upon them. It is not uncommon that a particular part, such as an engine casting may have hundreds of operations performed upon it in its transformation from a rough casting to a finished engine block. During such a production process a particular part may be moved from machine to machine wherein each machine may have in the neighborhood of 29 stations or different operations, which may include drilling, reaming, tapping, milling, etc. The various spindles and cutting tools on each machine which may range in the area of 140 in number are accurately positioned with respect to one another and this position is usually easily maintained.

However, when a particular part is moved from machine to machine, or from station to station within a machine, it must be reoriented with respect to the machine within a predetermined tolerance range in order to obtain an accurately machined part. On certain parts this is not a critical problem since often outside dimensions are of importance and an outside surface may be machined to provide a reference surface. In the production of engine blocks, however, the solution is not so simple since it is often interior dimensions which are critical and it is these portions which must be referenced to the machine tool. In particular in the machining of an engine block, the drilling or boring of a cylinder must be accurately located to prevent eccentric thin-walled cylinders and the like. It is necessary then to reach inside the cylinder block to locate some portion of the casting and then move the casting until such a reference position is attained. In the past, sensing probes and similar devices have been used, wherein the probes are inserted within the interior of the casting and provide an indication to control the positioning of the casting until a reference position is attained. Although these methods have proved satisfactory in the past, they are nothing more than an end position limit switch arrangement even though they may be incorporated in a highly refined system. Additionally, these systems usually select only one positioning point on the casting and, as is well known in the art, certain castings may vary in dimension throughout a specified tolerance range so that the positioning of the casting within the machine can only be as accurate as this variation in dimension. Usually in such systems the casting is initially checked in a previous station to reject all those whose dimensions fall outside of the specified tolerance range. This involves a separate operation or station and added cost to the production of the particular part.

Therefore, it is an object of this invention to provide improved apparatus for accomplishing the referencing of a workpiece to a machine tool.

It is another object of this invention to provide referencing apparatus which is particularly concerned with referencing an interior or not easily reached point to a machine tool although the apparatus may be used as well for more conventional exterior surface referencing.

It is a further object of this invention to provide referencing apparatus which supplies the impetus for moving the part to the final position without aid of any exterior transfer apparatus.

It is a still further object of this invention to provide referencing apparatus which selects a plurality of points of measurement and automatically divides any error of position of such points to bring the part to a reference position.

It is still another object of this invention to provide referencing and positioning apparatus which gauges whether such selected points are outside of a specified tolerance range and allows or prevents a further sequence of operations upon the part.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 1:
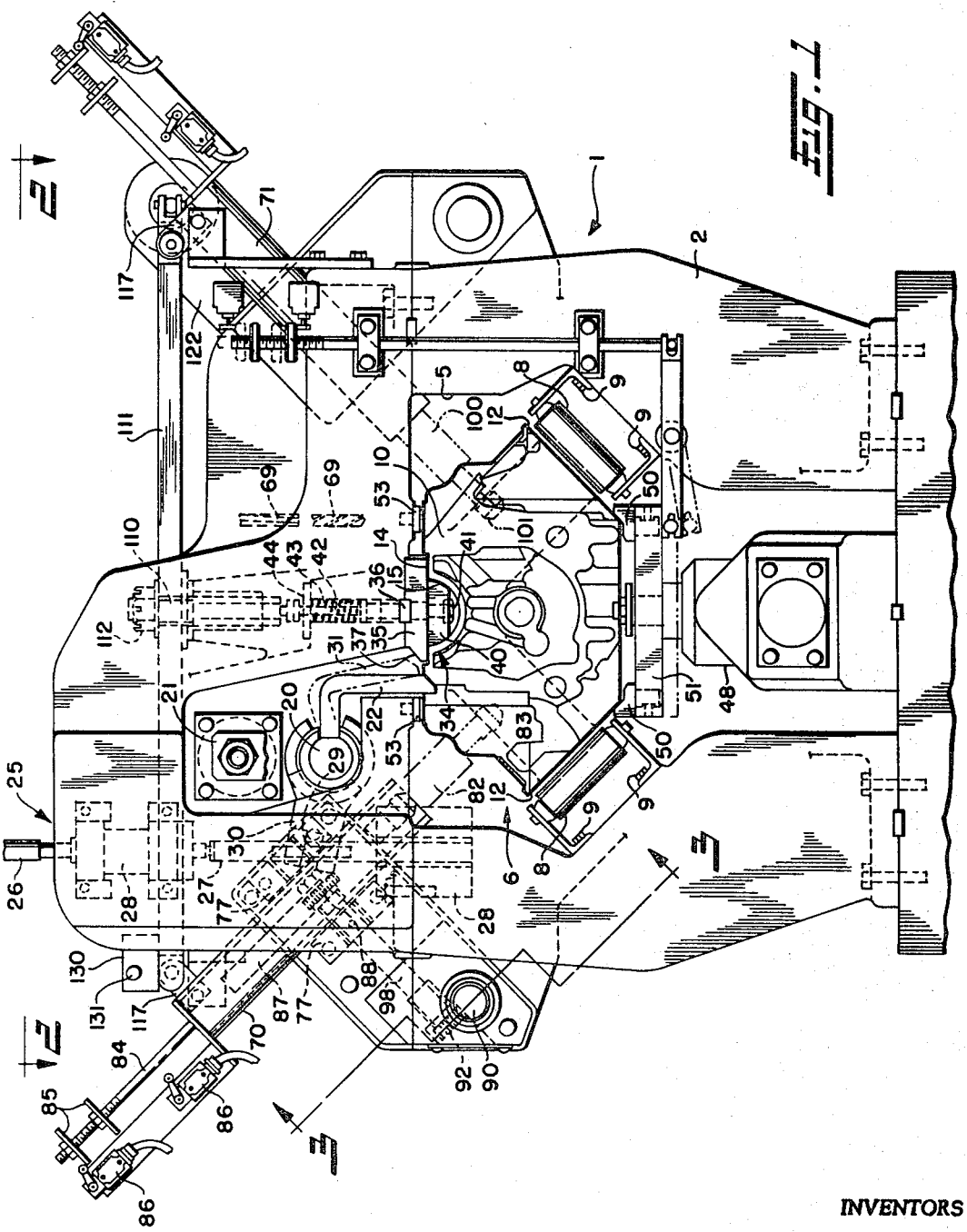
FIG. 1 is a front elevational view of a fixture showing an engine block located therein and the apparatus of the invention in relation to the engine block.
Figure 2:
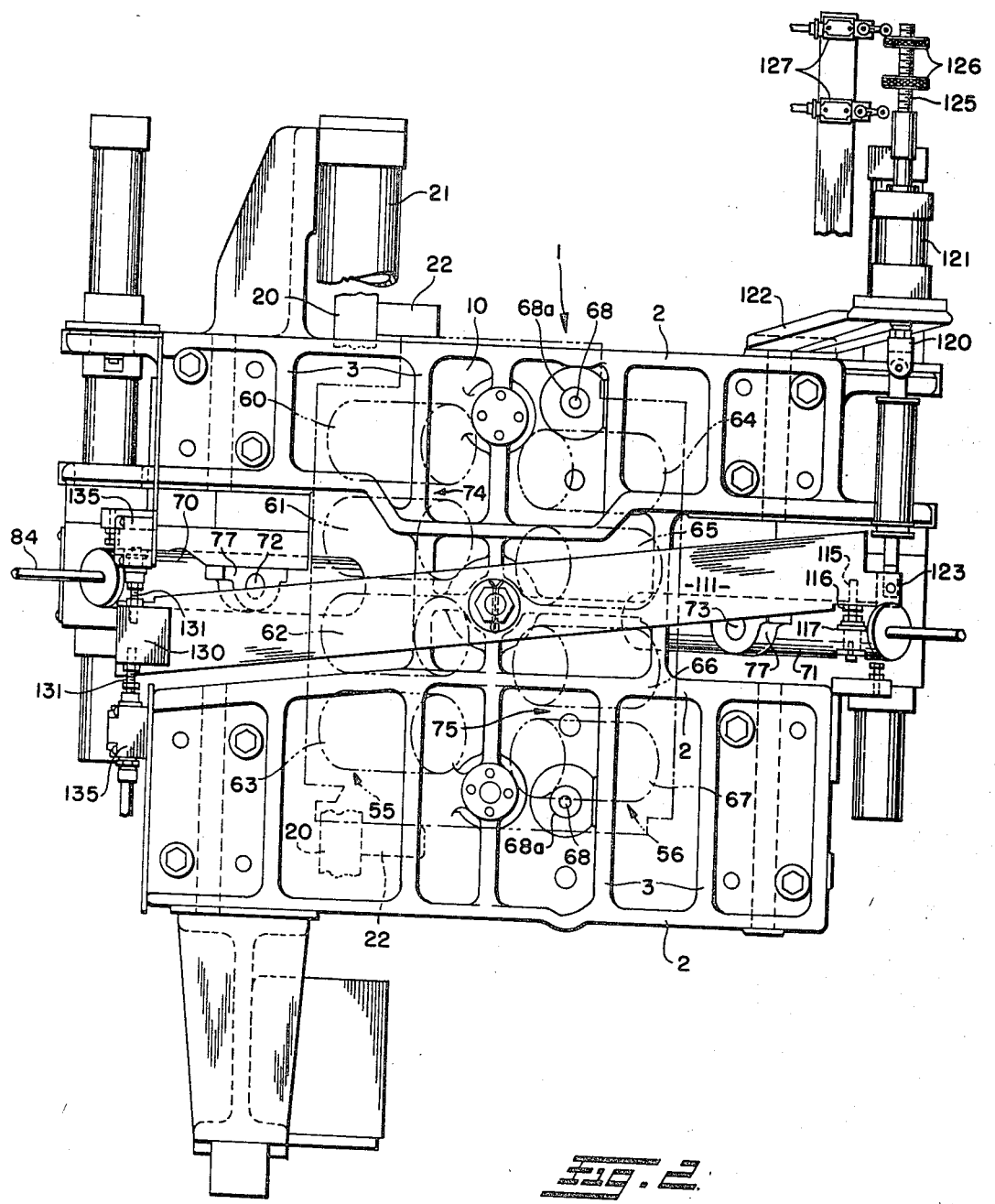
FIG. 2 is a plan view of the fixture and the apparatus of the invention taken along the line 2—2 of FIG. 1.

Referring now to FIGS. 1 and 2, the fixture shown generally at 1 comprises the first or qualifying station of a long line transfer and multiple station machine at which station it is desired to orient the part to be machined with respect to the machine tool and at which station manufacturing holes are drilled and reamed in the part to provide reference locations for later operations within the machine. The remainder of the machine is not shown; however, as is well understood in the art it comprises a plurality of machining stations, serially aligned and abutting the first or qualifying station with suitable transfer mechanisms provided so that parts may be readily transferred along the line.

The qualifying station fixture 1 may be a casting or of the construction of a plurality of parallel plates 2 retained in position by a plurality of webs 3 and weldments to provide a rigid structure of relatively light weight for supporting machining tools, the part to be machined and the transfer and orientation apparatus and controls therefor. All of the plates 2 have central apertures 5 which are aligned to provide a positioning area 6 within the fixture 1 where the part to be machined is located and where the machining for the manufacturing holes takes place. Two series of rollers 8 are mounted to the interior of the fixture by bolts 9 to provide a rolling support arrangement for the part to be machined. In this particular embodiment an engine block casting 10 is shown as the part to be machined and the engine block 10 has milled header portions 12 angularly related to one another to provide a convenient surface for transferring the engine block into the fixture and for supporting it therein. The engine block 10 has a recessed rectangular channel 14 at the top thereof as viewed in FIG. 1 together with several semicircular seats 15 located in the channel and which will eventually retain the crank shaft bearings for the engine. These partially finished surfaces provide reference surfaces for a preliminary orienting of the block 10 within the fixture 1.

A transfer mechanism comprising a long transfer bar 20 is supported on rollers (not shown) for rotative and axial movement and is actuated endwise by a piston and cylinder arrangement partially shown at 21. A pair of transfer fingers 22 are rigidly mounted on the transfer bar 20 and depend from the bar so that their free ends may abut the ends of the engine block 10. The transfer fingers 22 are spaced along the bar a distance equal to the length of the particular engine block so that the block 10 may be retained for endwise movement by the transfer fingers 22. Transfer bar rotation actuation mechanism is shown generally at 25 and comprises a hydraulic actuator, the piston 26 of which is seen in FIG. 1, and which vertically moves a rod 27 slidably mounted in bearings 28 attached to the fixture 1. A pin 29 radially mounted on the rod 27 for movement with the rod cooperates with a forked lever 30 which partially encircles the transfer bar 20 and which causes a rotative movement of the transfer bar while allowing the transfer bar to freely slide axially.

Thus when the engine block 10 is situated on a pair of transfer rails (not shown), coextensive with the plane of support of the rollers 8, the engine block 10 may be drawn into a rough location within the fixture 1 by the operation of the transfer bar mechanism as follows. The hydraulic cylinder is actuated to drive the rod 27 in a downward direction causing the forked lever 30 to rotate in a counter clockwise direction. Since the lever 30 entraps the transfer bar 20 rotatively, the transfer bar 20 together with the transfer fingers 22 will be rotated to the dotted position 31 shown in FIG. 1. The cylinder 21 is then actuated causing the transfer bar 20 to move axially outward from the fixture 1 to place the transfer fingers 22 endwise in location with respect to the ends of the engine block 10. The transfer bar 20 and transfer fingers 22 are then rotated clockwise to place the transfer fingers 22 in abutment with the ends of the engine block 10 and the hydraulic cylinder 21 is actuated in the reverse direction to draw the engine block 10 within the fixture 1. Such movement continues in the reverse direction until a limit switch (not shown) is actuated to stop fluid flow to the cylinder 21. This provides a rough endwise location for the engine block 10 within the fixture 1, which could be provided by any other suitable mechanism or even manually, however, in this embodiment such location is dependent upon the accuracy with which the transfer fingers 22 have contacted the engine block 10 on non-reference surfaces of the block, the tolerance range of the limit switch, its control over the transfer mechanism and the inertia of the engine block as it is drawn within the fixture.

Also as the engine block 10 is drawn within the fixture 1 there occurs a lateral alignment by cooperation of the engine block 10 with the lateral guide mechanism 34 retained in the fixture. The lateral guide mechanism 34 consists in part, of a first elongated rectangular guide block 35 laterally positioned in reference to the fixture 1 by a key 36 and secured to the upper interior surfaces of the fixture 1 by bolts, to be retained in the positioning area 6. The block 35 has a notch 37 at one corner thereof to provide clearance for the transfer fingers 22 on the transfer bar 20. A second elongated guide block 40 having a partially circular cross section with parallel plane upper and lower surfaces is resiliently mounted below the first block 35 by a bolt 41 threaded into a rod 42 guided by a sleeve in the first block 35 and biased downwardly by a spring 43 entrapped in a bore in the fixture between a shoulder on the rod 42 and a plate 44 bolted to the fixture 1. Thus the circular guide block 40 may be moved in a vertical direction but is restrained against shifting either endwise or laterally. As the engine block 10 enters the fixture the seats 15 for the bearings engage the circular guide block 40 and cause the engine block 10 to tend to become partially aligned laterally while resting on the rollers 10.

A hydraulic jack 48 is employed for the final lateral locating and it also performs a clamping function for the part to be machined in the fixture 1. The jack 48 is operative after the block 10 has received its critical endwise alignment. When the jack 48 is raised, corner angle blocks 50 carried on the jack platform 51 engage the angled lower surfaces of the engine block 10 to lift the block off the rollers 8. As the engine block 10 is raised the circular guide block 40 maintains abutment with the bearing seats 15 and causes lateral alignment of the engine block 10 as the spring 43 is compressed. Final lateral alignment is achieved when the notch 14 on the engine block 10 engages the rectangular guide block 35 in a slip clearance fit. Clamping and critical vertical alignment is achieved when the hydraulic jack 48 causes the engine block 10 to abut several stop pins 53 accurately mounted on the fixture 1.

In this particular embodiment of the invention the fixture 1 is adapted to receive a V-type engine block 10 having banks 55, 56 of four cylinders 60–67 angularly disposed relative to one another. It will be appreciated that the principles of this invention are not limited to this particular configuration and that the invention is useful for other types of engine blocks as well as any other part which must be critically oriented wtihin a fixture or other machining mechanism.

Figure 3:
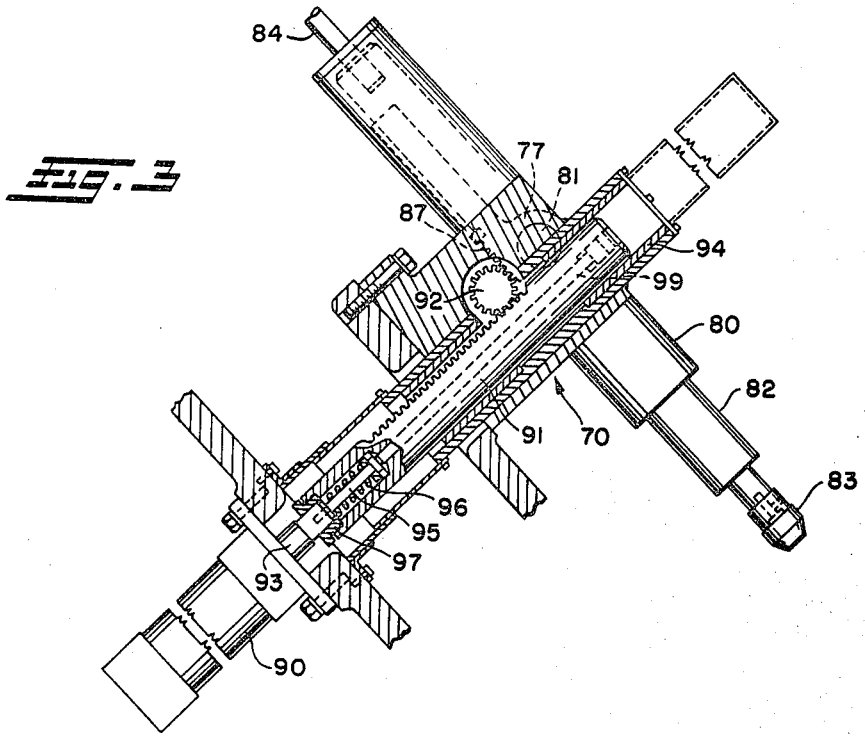
FIG. 3 is a view partly in section taken along the lines 3—3 of FIG. 1 showing in more detail the locator assembly and means for actuating same.

Prior to the clamping and machining of manufacturing holes 68 in the engine block 10, as by a drill and reamer assembly shown schematically at 69, and which may comprise any of the mechanisms well known in the art, the critical endwise positioning of the block 10 is performed. The drill and reamer are guided through bushings 68a on the fixture 1 to provide accurately positioned holes. A pair of locator assemblies 70, 71 are positioned on opposite lateral sides of the fixture 1 at endwise locations 72, 73 which correspond roughly with the recess between the outside walls of two pair of cylinders 61, 62 and 65, 66, which walls are within the engine casting. Thus in this embodiment as seen most clearly in FIG. 2, due to the offset of the banks 55, 56 of the engine cylinders the mounting locations of the locator assemblies are similarly offset. Other positions for the locator assemblies 70, 71 might also be used rather than having them closely opposite one another as, for instance, at location 74, 74 and still utilize the principles of this invention, however the mounting shown is the preferred embodiment of this invention. Each of the locator assemblies 70, 71 is pivotally mounted in a pair of pillow blocks 77 affixed to the plates of the fixture by bolts, for pivotal movement of the locator assemblies 70, 71 in a plane perpendicular to the plane of FIG. 1. As more clearly seen in FIG. 3 the locator assembly 70 comprises a housing 80 supported on stub shafts 81 journalled in pillow blocks 77 for pivotal movement of the locator assembly 70 in the plane of the drawing. A probe 82 comprising a cylindrical bar is located within the housing 80 and is slidable therein but is a close fit within the housing 80 so as not to allow any lateral movement. A probe tip 83 is inserted in the inner stepped-down end of the probe 82 for contacting the outside of a pair of cylinder walls 61, 62. A threaded rod 84 is located in the outer end of the probe 82 extending in an outward direction coaxial with the line of movement of the probe assembly and retains a pair of adjustable cams 85 to provide a means for actuating limit switches 86. Located on the underside of the central portion of the probe 82 is a linear rack 87 which meshes with a pinion gear 88 to provide the inward movement of the probe 82 into the interior of the engine block 10. The probe 82 is shown in FIG. 1 in both the retracted and extended positions and is shown in FIG. 3 in the extended position.

A hydraulic actuator 90 and second rack 91 and pinion 92, spaced a distance below the locator assembly 70 provide the actuation for driving and retracting the probe 82. The cylinder of the actuator 90 is attached to a portion of the fixture 1 by means of bolts. The piston rod 93 of the actuator 90 is operatively connected to the second rack 91 which in turn is slidably mounted within a housing 94 which confines the rack 91 for axial movement. The connection between the piston rod 93 and the rack 91 is located in a bore in one end of the rack 91 and provides a resilient engagement of the probe tip 83 with the sides of the cylinders 61, 62. The connection comprises a bolt 95 threaded into one end of the piston rod 93, acting against a spring 96 located between the head of the bolt 95 and a collar 97 which slidably receives the piston rod 93 and is threadedly engaged with the bore in the end of the rack 91. Thus when the hydraulic actuator 90 moves the piston rod 93 in a downward direction as shown in FIG. 3, the bolt 95 will be carried with the piston rod 93 compressing the spring 96 and causing a bias to be placed against the collar 97, thereby urging the rack 91 in the downward direction. This causes a clockwise rotation of the pinion 92 which is translated as a clockwise rotation to the pinion 88 by way of a connecting rod 98 to drive the rack 87 on the underside of the probe 82 and thus the probe tip 83 in a downward direction or in a direction inward of the engine block 10. When the probe tip 83 abuts the cylinder walls 61, 62 of the engine block 10 it will wedge, because of its tapered tip, into a location intermediate of the outside of the cylinder walls 61, 62. The probe tip 83 will cease inward movement upon being firmly wedged between the cylinder walls 61, 62 while the hydraulic actuator 90 continues to produce a seating force through the intermediary of the spring 96. In order to retract the probe 82 from within the engine block 10 after dimensioning and gauging has been completed, the hydraulic actuator 90 is reversed driving the piston rod 93 and the bolt 95 upwardly as seen in FIG. 3 until the head of the bolt 95 engages the bottom of the bore in the rack 91 and causes a positive upward movement of the rack 91. A rod 99 threaded into a second bore extending along the length of the rack 91 may be adjusted from the opposite end to provide a means for varying the bias of the spring 96 and the end positions of the probe 82. The pair of limit switches 86 fixed to the upper end of the housing 80 of the locator assembly 70 provide means for setting the end positions of movement of the probe 82.

Thus when the engine block 10 has been brought into a rough endwise location within the fixture 1 by the transfer bar mechanism and is freely slidable on the rollers 8, the locator assemblies 70, 71 are actuated to drive the probes 82, 100 through cored holes (which might be expansion plug holes) in the adjacent surfaces of the engine block 10 until the probe tips 83, 101 enter between adjacent cylinders 61, 62 and 65, 66 to wedge between the outside cylinder walls. During this operation there may be some pivotal movement of the locator assemblies 70, 71 in the pillow blocks 77 or even endwise sliding movement of the engine block 10 as the probe tips 83, 101 seek their inwardmost penetration and an alignment midway between the cylinder walls.

In the center of the fixture and on the top side thereof, there is located a vertical post 110 on which is pivotally mounted an equalizer bar 111 which is held in location by a castle bolt 112. As best seen in FIG. 2 the equalizer bar 111 consists of a flat bar of rigid material such as steel which extends laterally across the width of the fixture 1 to cooperate with the upper ends of the locator assemblies 70, 71. Bolts 115, threaded into notches in either end of the bar 111, are adjustably retained in position by jam nuts 116. In endwise alignment with the bolts 115 are a pair of flanges 117 affixed to the upper ends of the housing 80 of each of the locator assemblies 70, 71 and bolted together to provide a rigid abutment. Although the bolts 115 and the flanges 117 are shown in abutting relationship in FIG. 2, it will be appreciated that there may be clearance between them when the probe assemblies 70, 71 are initially located or when the equalizer bar 111 is shifted to a slightly more counter clockwise location than that shown in FIG. 2.

A ram 120 and cylinder 121 assembly is shown affixed to a mounting plate 122 on the fixture 1 on the righthand side thereof, the ram 120 being pivotally coupled to the forked righthand end 123 of the equalizer bar 111. A threaded rod 125 is affixed to the opposite end of the ram 120 and carries adjustable cams 126 for cooperation with limit switches 127 to control the extent of movement of the ram 120 and thus the equalizer bar 111. On the lefthand end and on top of the equalizer bar 111 is mounted a block 130 into which are threaded a pair of bolts 131 whose extension from the block may be adjusted to cooperate with a pair of limit switches 135 fixedly attached to nearby portions of the fixture 1. When the cylinder 121 is actuated to move the ram 120 endwise or in a downward direction as shown in FIG. 2, the equalizer bar 111 will be rotated in a clockwise direction and the bolts 115 will abut the flanges 117 on the locator assemblies 70, 71 thereby tending to pivot each of the locator assemblies 70, 71 in a clockwise direction as seen in FIG. 2. Similarly, the bolts 131 on the lefthand end of the equalizer bar 111 will actuate the pair of microswitches 135 depending upon the amount of rotation of the equalizing bar 111 and the adjusted length of the bolts 131.

Since the probe tips 83, 101 of the locator assemblies 70, 71 have been wedged between adjacent cylinders in the opposite banks 55, 56 of cylinders, any pivotal movement of either of the locator assemblies 70, 71 by the equalizer bar 111 will be transmitted to the engine block 10 through the probe tips 83, 101 to cause an endwise shifting of the engine block 10 on the roller supports 8. If the locator assembly 71 on the righthand side of the fixture 1 as viewed in FIG. 2 is abutted first by the bolt 115 on the equalizer bar 111, it will be rotated clockwise causing the engine block 10 to be shifted endwise toward the top as viewed in FIG. 2. Such movement of the engine block 10 will cause a counter clockwise rotation of the left side locator assembly 70 tending to bring the flange on that locator assembly 70 toward the adjacent bolt 115 on the left end of the equalizer bar 111. In the event that the locator assembly 70 on the left side of the fixture 1 is abutted first by the equalizer bar 111, this movement will be reversed and the engine block 10 will be shifted downward as viewed in FIG. 2. Only when both bolts 115 on the equalizer bar 111 have abutted both locator assemblies 70, 71 will no further movement of the engine block 10 be possible.

Figures 4, 5:
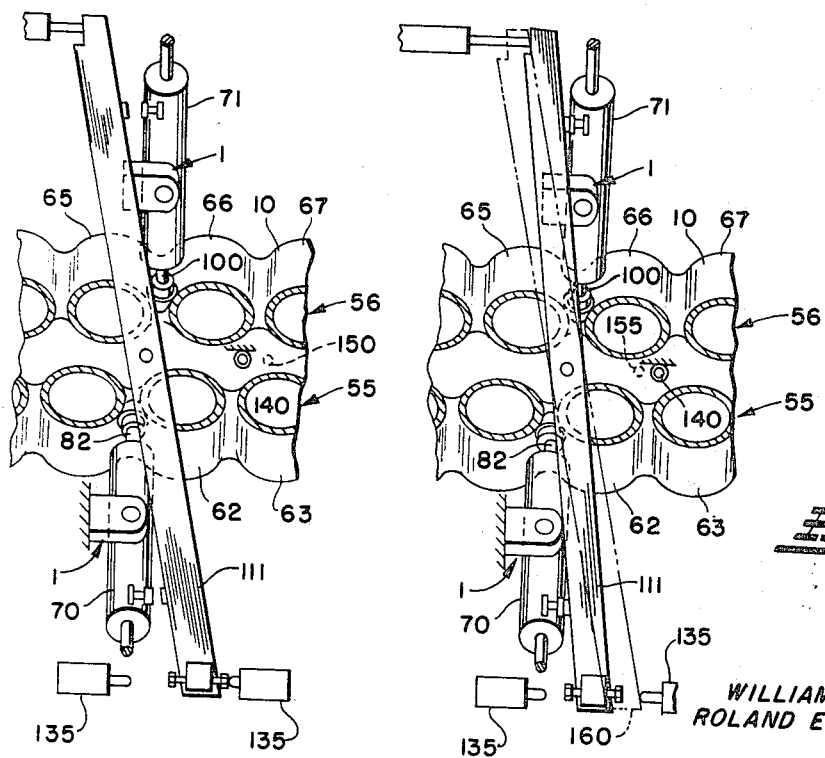
FIGS. 4 and 5 are schematic representations of the apparatus of the invention in relation to an engine block and showing the positioning, equalizing and gauging functions of the invention.

Referring now to FIGS. 4 and 5, there are shown schematic representations of the equalizer bar 111 and the locator assemblies 70, 71 in exaggerated relation to a typical engine block 10 to clarify the positioning and gauging function of the apparatus of the invention in regard to locating a manufacturing hole in the engine block 10. In manufacturing operations of this type, all tooling is referenced to the fixture and once a manufacturing hole has been provided it is a relatively easy matter to shift the part to be machined to other stations of the machine tool or even to different machine tools and maintain precise alignment merely by gauging from the manufacturing hole. In particular with engine blocks it is important that the drilling and boring of cylinders take place as concentrically as possible with the stock provided in the casting so that a maximum reliability of engine performance may be maintained. For purposes of this description therefore, it is only necessary to assume that the drill and reamer assembly 69 which machines the manufacturing holes accurately related with respect to the fixture 1 and that all further tooling is similarly related to shot pins (not shown) which locate on the manufacturing holes and which bring a part to be machined into a reference position at each machining station.

If now it is assumed only for purposes of the following discussion, that the drill and reamer which machine a manufacturing hole are guided through a bushing 140, stationary in relation to the fixture 1, then the location of the bushing 140 in FIGS. 4 and 5 may be used as a reference point on the fixture and the following descriptions will show how the apparatus of the invention accurately positions the engine block 10 with respect to the fixture 1, divides out any error between the banks 55, 56 of cylinders of the engine block 10, and gauges the final position of the engine block 10. In FIG. 4 the engine block 10 has been roughly positioned so that desired placement for one manufacturing hole is coincident with the bushing 140 on the fixture. The equalizer bar 111 is shown in the non-actuated position while the probes 82, 100 of the locator assemblies 70, 71 have been actuated to wedge the probe tips between adjacent cylinder walls 61, 62 and 65, 66. It can be seen that the distance that the equalizer bar 111 must travel to abut the upper probe 71 is equal to the distance that the equalizer bar 111 must travel to abut the lower probe 70. Thus as seen in FIG. 5 when the equalizer bar 111 has been actuated, each of the probes 70, 71 is abutted simultaneously and no endwise shifting of the engine block 10 occurs. The final position of the equalizer bar 111 is seen to lie midway between the limit switches 135 which determine the tolerance range of the measurement.

Referring again to FIG. 4, if now it is assumed that the engine block 10 has been roughly located slightly to the right so that the desired location of the manufacturing hole is at the point indicated by the dashed circle 150, then the following relationships may be visualized. When the upper probe 71 is actuated to wedge between adjacent cylinder walls 65, 66, the final position of the probe 71 will be in a position shifted slightly counter clockwise from that shown in FIG. 4 to bring the abutment end of the upper probe 71 closer to the equalizer bar 111. Similarly, the lower probe 70 will attain a rest position shifted slightly clockwise from that position shown in FIG. 4 so that the abutment end of this probe 70 is at a relatively large distance from the equalizer bar 111. Actuation of the equalizer bar 111 will cause an initial abutment with the upper probe 71 causing a shifting of the engine block 10 endwise to the left and a counter clockwise rotation of the lower probe 70 until both probes 70, 71 are abutted. It may be seen that the engine block 10, probes 70, 71 and equalizer bar 111 attain the same rest position as that shown in FIG. 5 with the desired manufacturing hole 150 coincident with the bushing 140.

Referring again to FIG. 4, if now it is assumed that only the upper bank 56 of cylinders is shifted to the right due to casting inaccuracies while the lower bank 55 of cylinders lies in the same rest position as that shown in FIG. 4, the following relationships may be visualized. Although the desired manufacturing hole location for the lower bank of cylinders is coincident with the bushing 140 such location would cause great eccentricity for the cylinders of the upper bank 56. Upon actuation the upper probe 71 will define a line midway between the cylinders 65, 66 and the probe 71 will attain a rest position shifted slightly counter clockwise from that shown in FIG. 4. Upon actuation of the equalizer bar 111 the upper probe 71 will be abutted initially causing endwise shifting of the engine block 10 to the left and counter clockwise rotation of the lower probe 70. Movement again continues until both probes 70, 71 have been abutted whereby it is seen that the desired location of the manufacturing hole for the lower bank 55 of cylinders has shifted slightly to the left to the position shown by the dashed circle 155 in FIG. 5. The equalizer bar 111 will come to rest at the position indicated by the dashed line 160 in FIG. 5 shifted slightly counter clockwise from the end position described previously. It may readily be seen that the limit switches 135 may be adjusted endwise to provide any desired tolerance range whereby it is only necessary that in order to have an accurate casting that the left limit switch be not actuated while the right limit switch be released from its normally actuated position.

Thus it is seen that not only has the apparatus of the invention provided a final position for the engine block 10 accurately related with respect to the fixture 1 but it has also provided a division of the error between the cylinders. Although the drilling for the lower bank 55 of cylinders in the latter situation will be slightly eccentric with respect to the stock in the casting it is seen that a similar eccentricity is provided for the upper bank 56 of cylinders while preventing drilling of any greatly eccentric cylinders for either bank of the engine block.

By similar analyses it may be ascertained that the apparatus of the invention produces a similar positioning and gauging function for other types of cylinder casting inaccuracies, including the equalization of metal around the cylinder walls when the banks of cylinders remain respectively aligned but the amount of metal in the casting varies to provide greater or smaller diameter cylinder stock. Also, the apparatus of the invention is not to be construed as limited to a v-block casting as the principles of the invention are applicable to in-line type engines as well as any workpiece which must be positioned with an apportionment of error between several reference surfaces. It is clear also that the limit switches 135 may provide a signal to actuate a mechanism for discarding an out-of-tolerance workpiece or may condition later stations to prevent further machining upon the workpiece. Similarly, such monitoring of tolerances provides useful signals for maintaining a measure of control over any earlier stages in the production of a workpiece as, for example, at the foundry stage where the casting for the workpiece is performed.

We therefore particularly point out and distinctly claim as our invention:

1. Apparatus for referencing a workpiece within a fixture, comprising a pair of probes mounted on opposite lateral sides of the fixture for pivotal movement in a longitudinal direction, means for actuating said probes from recessed to workpiece engaging positions whereat said probes engage reference surfaces of the workpiece, a bar pivotally mounted on the fixture intermediate said probes, one end of said bar being adjacent one probe at a longitudinal side thereof and the other end adjacent the other probe at the opposite longitudinal side thereof, means for pivoting said bar against one of said probes to pivot the latter and thereby move the workpiece longitudinally, with the other of said probes pivoted by such movement of the workpiece into abutment with said bar to bring both reference surfaces of the workpiece into optimum alignment with the fixture.

2. Apparatus as set forth in claim 1, further including means for sensing the position of said bar to gauge the alignment of the reference surfaces of the workpiece with the fixture.

3. Apparatus as set forth in claim 2, wherein said sensing means comprises a pair of limit switches adjustably mounted on the fixture in operative relationship with said bar and adjustable to vary the range of tolerance of alignment of the reference surfaces of the workpiece with the fixture.

4. Apparatus as set forth in claim 1, for gauging engine blocks wherein each of said pair of probes comprises an elongated member having a tip at the workpiece engaging end and an abutment surface at the other end, with the tip shaped so that its engagement with the outside walls of an adjacent pair of cylinders in such an engine block locates the probe midway between the engaged cylinder walls.

5. Apparatus as set forth in claim 4, wherein the tip on each of said pair of probes is tapered so that upon actuation to workpiece engaging position the tip will wedge between adjacent cylinder walls to entrap the probe for movement with the engine block.

6. Apparatus as set forth in claim 5, wherein each of said elongated members comprises a housing pivotally mounted on the fixture with a reciprocable rod slidable therein, the rod being actuatable between a recessed position clear of the workpiece and an extended position therein for engaging interior surfaces of the workpiece.

7. Apparatus as set forth in claim 3, further including means for clamping the workpiece in optimum alignment in the fixture comprising a hydraulic jack assembly engageable with the workpiece to raise the workpiece into abutting relationship with the fixture while maintaining the longitudinal alignment.

8. Apparatus as set forth in claim 7, further including guide means on the fixture cooperative with the workpiece to laterally and vertically align the workpiece when raised by said clamping means.

References Cited

UNITED STATES PATENTS

| | | | |
|---|---|---|---|
| 2,193,840 | 3/1940 | Oberhoffken et al. | 29—33 |
| 2,392,169 | 1/1946 | Mansfield | 29—33.12 |
| 2,570,589 | 10/1951 | Phillips | 29—33.12 |
| 2,808,746 | 10/1957 | Blomquist | 29—33.12 |

WILLIAM D. MARTIN, JR., *Primary Examiner.*